(12) United States Patent
Lo et al.

(10) Patent No.: US 7,987,460 B2
(45) Date of Patent: Jul. 26, 2011

(54) AUTOMATION TOOL FOR APPLICATION INSTALLATIONS

(75) Inventors: Florence Lo, El Dorado Hills, CA (US); Richard Steele, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1324 days.

(21) Appl. No.: 11/545,229

(22) Filed: Oct. 10, 2006

(65) Prior Publication Data

US 2008/0098387 A1   Apr. 24, 2008

(51) Int. Cl.
G06F 9/44 (2006.01)
G06F 9/445 (2006.01)

(52) U.S. Cl. ........................................ 717/174; 717/168
(58) Field of Classification Search .................. None
See application file for complete search history.

(56) References Cited

U.S. PATENT DOCUMENTS

| 6,681,391 | B1 * | 1/2004 | Marino et al. ................. 717/175 |
| 2002/0087668 | A1 * | 7/2002 | San Martin et al. .......... 709/221 |
| 2002/0188941 | A1 * | 12/2002 | Cicciarelli et al. ............ 717/175 |
| 2004/0060045 | A1 * | 3/2004 | Hind et al. ..................... 717/174 |
| 2007/0226726 | A1 * | 9/2007 | Robsahm ...................... 717/168 |

\* cited by examiner

*Primary Examiner* — Wei Zhen
*Assistant Examiner* — Lanny Ung
(74) *Attorney, Agent, or Firm* — Schwabe, Williamson & Wyatt, P.C.

(57) ABSTRACT

Methods, apparatuses, articles, and systems for identifying, by a state machine, a first module installation of a first module of a plurality of modules of one or more applications, at least a subset of the modules each having one or more installation relationships with one or more other modules of the plurality of modules, and the identifying being based at least in part on the first module's installation relationship(s), if any, with the other modules as described by a data structure describing the installation relationships of the plurality of modules, are described herein. In various embodiments, the state machine may further execute the first module installation and repeat the identifying and the executing for at least a second module installation of a second module of the plurality of modules.

21 Claims, 3 Drawing Sheets

AUTOMATION TOOL FOR APPLICATION INSTALLATIONS

TECHNICAL FIELD

Embodiments relate to the field of data processing, in particular, to methods and apparatuses for identifying and executing installations of a plurality of application modules based on installation relationship(s) of the modules, where the relationships may be described by a data structure.

BACKGROUND

Continuous advances in processing speed, storage size, and networking have allowed for the development of applications, applications suites, and platforms of increasing complexity. Often such software components comprise a plurality of modules, each module having its own installation executable responsible for installing that module. To meet these installation needs, programs have been developed that are capable of chaining the multiple installations of the multiple modules, such as install wizards. These programs sometimes include scripts capable of checking codes returned by executions of installations to determine whether the installations were successful. Such programs, however, have a number of disadvantages. First, these programs fail to monitor parent-child relationships between the modules, insuring that installations of child modules of a parent module have been completed before executing an installation of another module that is not a child of the parent. Second, such programs do not include specific success criteria for each installation, and thus do not allow multiple installations to be simultaneously launched while ensuring the successful completion of each.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include, but are not limited to, methods and apparatuses for identifying, by a state machine, a first module installation of a first module of a plurality of modules of one or more applications, at least a subset of the modules each having one or more installation relationships with one or more other modules of the plurality of modules, and the identifying being based at least in part on the first module's installation relationship(s), if any, with the other modules as described by a data structure describing the installation relationships of the plurality of modules. In various embodiments, the state machine may further execute the first module installation and repeat the identifying and the executing for at least a second module installation of a second module of the plurality of modules.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
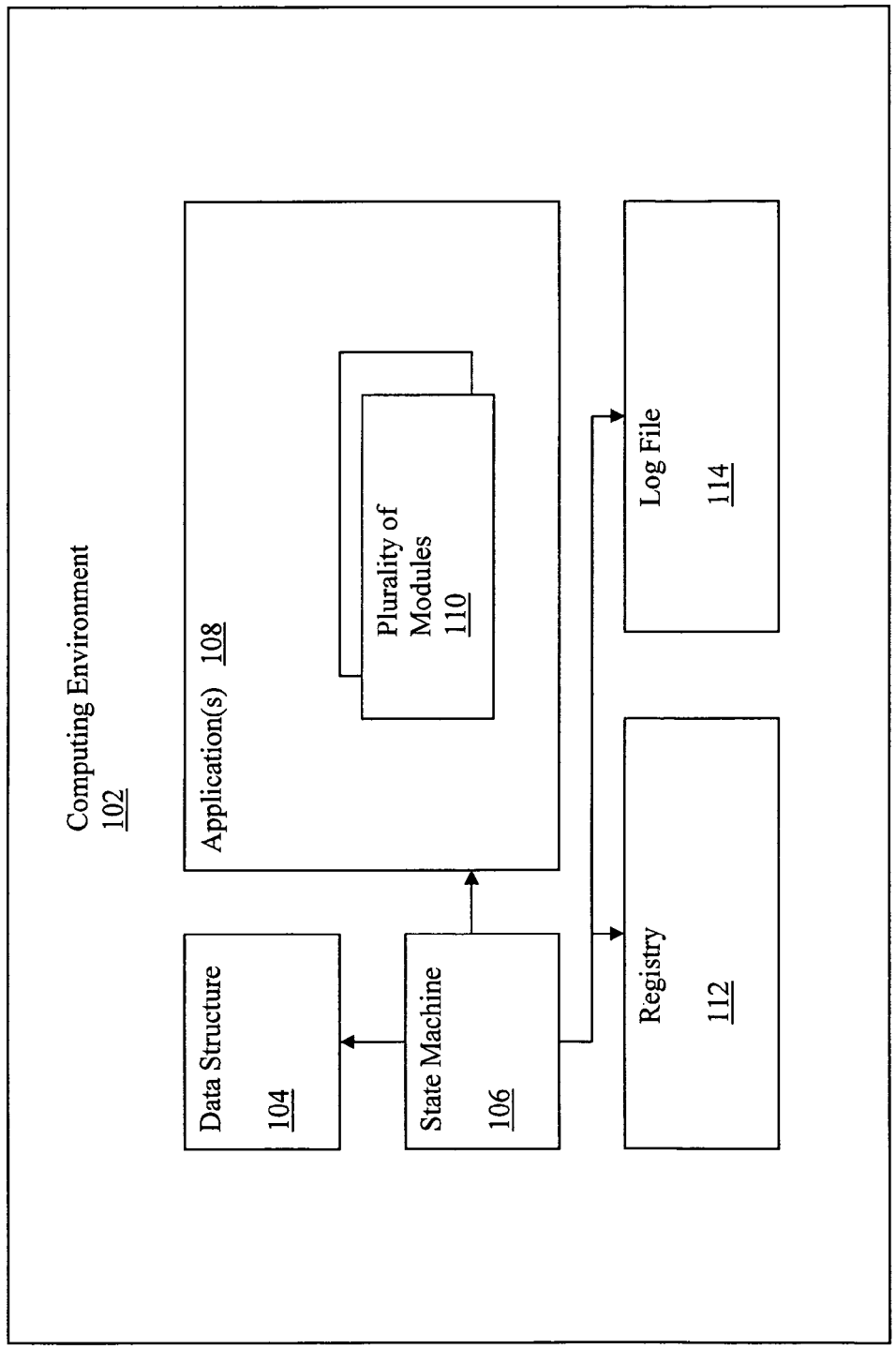
FIG. 1 illustrates an overview of various embodiments of the present invention, identifying and executing installations of a plurality of application modules based on installation relationship(s) of the modules, the relationships may be described by a data structure.

FIG. 1 illustrates an overview of various embodiments of the present invention, identifying and executing installations of a plurality of application modules based on installation relationship(s) of the modules, the relationships described by a data structure. As illustrated, a computing environment 102 may include a data structure 104 and a state machine 106, the state machine 106 adapted to identify installations of modules 110 of application(s) 108 based on installation relationships between ones of the modules 110. The installation relationships, such as parent-child relationships, may be described by data structure 104. The state machine 106 may further execute identified installations, receive return values from the execution of the installations, and compare the returned values to installation success criteria for the modules to determine whether the installations were successful. Each module 110 may have its own one or more success criteria, which may be stored in data structure 104. In some embodiments, the state machine 106 may store indicia of the success of installations in one or both of a registry 112 and a log file 114.

Figure 3:
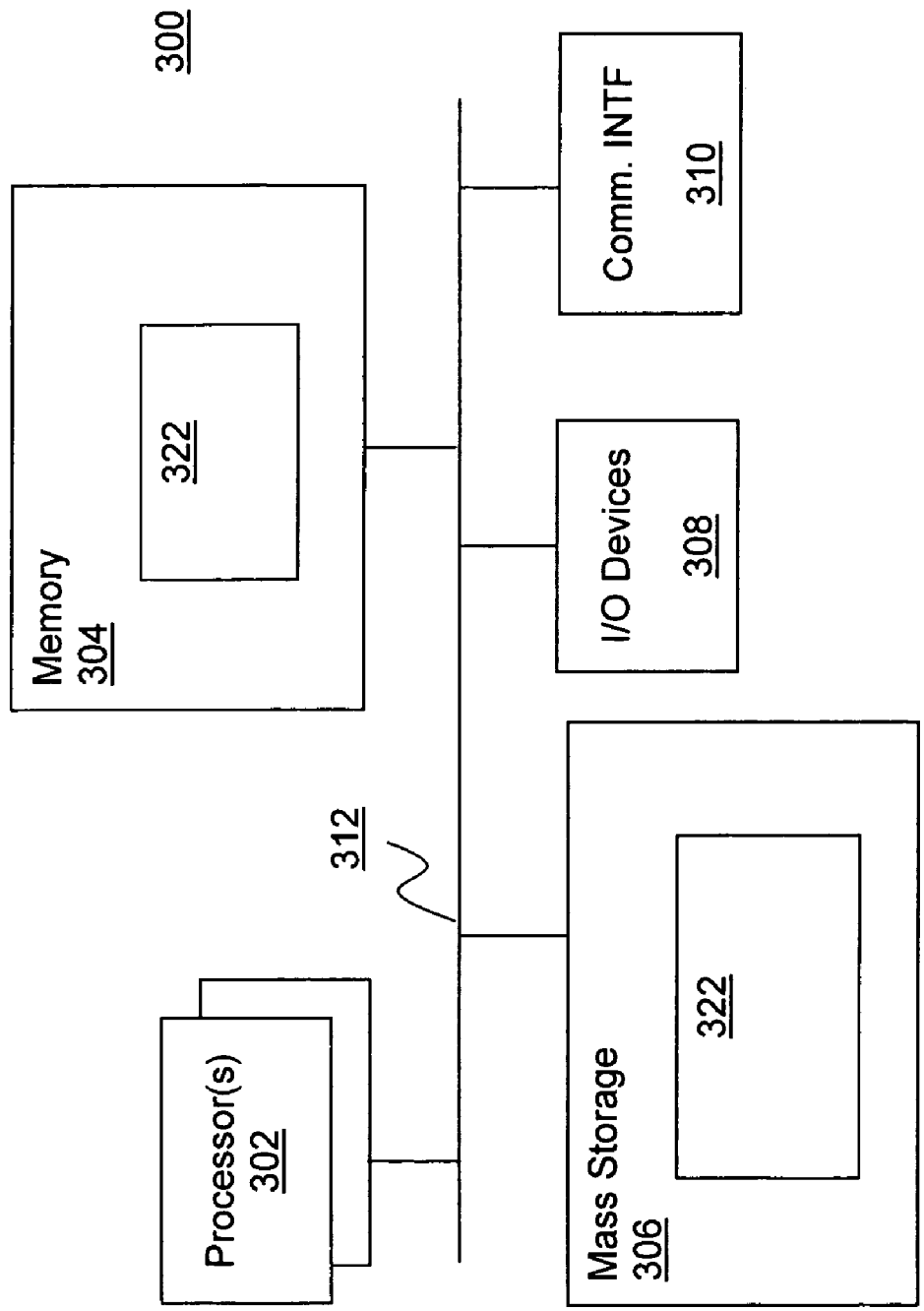
FIG. 3 illustrates an example computer system suitable for use to practice various embodiments of the present invention.

In various embodiments, computing environment 102 may comprise one or more of any single- or multi-processor or processor core central processing unit (CPU) computing system. Computing environment 102 may be or include a personal computer (PC), a workstation, a server, a router, a mainframe, a modular computer within a blade server or high-density server, a personal digital assistant (PDA), an entertainment center, a set-top box, or a mobile device. Each computing system of computing environment 102 may be capable of operating a plurality of operating systems (OS) in a plurality of virtual machines using virtualization technologies. An exemplary single-/multi-processor or processor core computing system of computing environment 102 is illustrated by FIG. 3, and is described in greater detail below. Hereinafter, including in the claims, processor and processor core shall be used interchangeable, with each term including the other.

In embodiments where computing environment 102 is comprised of two or more computing systems, the computing systems may be connected by a networking fabric and may each include all or portions of at least one of data structure 104, state machine 106, application(s) 108, modules 110, registry 112, and log file 114. The networking fabric connecting the computing systems may be any sort of networking fabric known in the art, such as one or more of a local area network (LAN), a wide area network (WAN), and the Internet. The computing systems may further use any communication protocol known in the art, such as the Hypertext Transfer Protocol (HTTP), and any transport protocol known in the art, such as the Transmission Control Protocol/Internet Protocol (TCP/IP) suite of protocols.

As illustrated, data structure 104 may be any one or more files of computing environment 102 capable of storing data relevant to installations of modules 110. In some embodiments, portions of data structure 104: may be located on a plurality of computing systems of computing environment 102. Data structure 104 may comprise, for example, an extensible markup language (XML) file capable of storing installation information in a nested fashion. In one embodiment, the XML file/data structure 104 may have a root element corresponding to application(s) 108, and may include, nested within that element, further elements for each of the plurality of modules 110. Such elements may comprise nodes of a tree structure implemented through XML, with a plurality of branches of the tree structure corresponding to installation relationships of at least some of the modules 110 with others of the modules 110. Each element for a module 110 may also include, in a nested fashion, other elements for other modules 110. Such nested relationships between elements associated with modules 110 may be indicative of parent-child relationships between the modules 110. A parent-child relationship may be one where an installer of one module 110 (the "parent") is adapted to spawn one or more installers of other modules 110 (the "child/children"). The ordering of the elements of the XML file/data structure 104 may correspond to an ordering of the installations of modules 110. In addition to elements corresponding to modules, data structure 104 may also include one or more success criteria for at least one of the modules 110. The success criteria may be represented, for example, as attributes of the module 110 elements, and may include a value expected to be returned by an installer of a module 110 upon its execution to indicate success, a registry key and/or registry key value/setting expected to be present in registry 112 upon a successful installation, and a file version of a successfully installed module 110. Additional information may also be stored as attributes of the elements of data structure 104, such as values indicating the criticality level of a failed installation of a module 110, including "warning" and/or "critical", and command lines capable of being invoked to execute an installer of the module 110 associated with the element having the attribute. Although data structure 104 has been primarily described herein as an XML file, any other data structure known in the art capable of storing the above information and of storing module 110 ordering and relationships may serve as data structure 104.

In some embodiments, data structure 104 may be created by a computing system user. The computing system used to create data structure 104 may be a computing system of computing environment 102, but need not be. In one embodiment, the user may first create a new file, such as an XML file, and may enter all of the XML information, such as the above described elements and attributes. In another embodiment, the data structure may be at least partially generated by an application, such as state machine 106, which may be adapted to read plurality of modules 110, determine success criteria and installations relationships, and write data structure 104 to store at least some of the installation information based on the reading. The generated file/data structure 104 may then be reviewed and edited by a user.

As is shown, state machine 106 may be any sort of process or thread adapted to read data structure 104, execute or cause to be executed installations of modules 110 based on data structure 104, write results of the executions to registry 112 and/or log file 114. In some embodiments, state machine 106 may be further adapted to compare success criteria read in from data structure 104 to the execution results written by state machine 106, and if an installation was unsuccessful, re-execute the installer for the unsuccessfully installed module 110. In one embodiment, state machine 106 may be an ActiveX dynamic link library (DLL), developed, for instance, in the VB.net programming language. In another embodiment, state machine 106 may comprise an installer wizard/application having a graphic user interface to enable a user to view and/or interact in the installation process.

In some embodiments, state machine 106 may first be initialized. State machine 106 may be initialized in response to user inputs, such as command line entry or selection of a graphic user interface (GUI) component, may be initialized at start up of a computing system of computing environment 102, or may be invoked when a user attempts to install application(s) 108 based, for example, on a setting electing to use state machine 106 as a default installer. Upon initialization, state machine 106 may determine which application(s) 108 is/are to be installed, and may locate and read a data structure 104 having information associated with the installations of modules 110 of application(s) 108. The state machine 106 may receive an indication of the appropriate application(s) 108 and/or of the data structure 104 either automatically from another process or through manual user inputs, such as the entry of a file path of the data structure 104. Upon receiving an indication of the appropriate data structure 104, state machine 106 may read the data structure 104 to extract installation ordering and relationships of modules 110, and success criteria that may be stored for at least some of the modules 110. The data structure 104 may be completely read all at once, or read incrementally, one element associated with one module 110 at a time. State machine 106 may read the information from data structure 104 into a tree structure, creating a node of the tree for each module 110, and using the nesting arrangement of data structure 104, described above as a basis for the structure of the tree. State machine 106 may then also read in a registry hive, registry keys, and capsule names associated with application(s) 108 and application(s) 108s' module 110s' installers, enabling state machine 106 to read from and write to appropriates keys/portions of registry 112. In other embodiments, the above registry information may be obtained by reading through application(s) 108, or from another source. In addition to reading the installation information from data structure 104 and registry information, state machine 106 may create one or both of registry 112 and log file 114 to write installation execution results to. Registry 112 and log file 114 may be created or initialized in any sort of manner known in the art, as is described further below.

Upon reading data structure 104, state machine 106 may execute installations of modules 110 in the order set forth in data structure 104. For example, state machine 106 may identify the first module 110 read from data structure 104, and may execute an installer associated with that module 110. In some embodiments, executing the installer may involve invocation by the state machine 106 of a command line. The path of the command line may, in some embodiments, be read from the data structure 104. After executing the installer of the first module 110, the state machine 106 may determine if there are additional modules 110 to install, and identify the next module by reference to the ordering read from the data structure 104. State machine 106 may then execute the installer associated with the next identified module 110. The processes of identifying and executing may be repeated until state machine 106 determines that an installation of the last module 110 read from data structure 104 has been executed. In determining both the next installation and whether there are additional modules 110 to install, state machine 106 may use a tree structure which may represent the modules 110, their installation ordering, and parent-child relationships, such as the tree structure described above. Reference to the tree structure by state machine 106 may facilitate the state machine 106 in recognizing parent-child relationships between installations of modules 110. For example, upon recognizing that "children" installations of modules 110 have yet to complete, state machine 106 may wait until each child installation is complete before proceeding with further installations.

Upon executing the installer of each module 110, state machine 106 may write information such as the identity of module 110, the command line invoked, and the date and time of execution of the module's installer to registry 112 and log file 114. State machine 106 may also write a value indicating whether installation has been attempted to registry 112 and/or log file 114. The value may simply be a binary value, or may be a counter indicating a number of times installation has been attempted. Also, state machine 106 may receive a return value from each installer after its invocation which may be indicative of success or failure. To determine whether each installation is successful, state machine 106 may compare the return value to an expected return value of the success criteria, in one embodiment. In other embodiments, rather than comparing the return value to one of the success criteria, state machine 106 may check for the presence of one of the success criteria, such as a registry key or a file version, after executing an installation. For example, if a certain setting in registry 112 is associated with a successful installation, state machine 106 may check the setting to determine whether installation was successful.

If the comparison indicates that the installation was successful, state machine 106 may write a value to registry 112 and log file 114 indicating success, and may remove the node from the tree structure associated with the module 110 determined to have been successfully installed. If the comparison indicates that the installation was unsuccessful, state machine 106 may write a value to registry 112 and log file 114 indicating failure. In one embodiment, data structure 104 may include a criticality level for at least one of the modules 110, as described above. State machine 106 may be adapted to read the criticality levels into the tree structure, and upon determining that an installation has failed, state machine 106 may check the criticality level of the installation-failed module 110 to determine whether the criticality level is "warning" or "critical." If "warning", state machine 106 may continue to identify and execute further module 110 installations and may remove the node from the tree structure associated with the module 110. If "critical", state machine 106 may halt all installation processes and, in some embodiments, uninstall one or more of the module 110 of application(s) 108 that have been installed thus far. In such an event, state machine 106 may also clear registry 112 and build log 114 of information written during the installation processes.

Upon determining that an installation of each module 110 has been executed by reference to the tree structure (which should be empty of nodes), state machine 106 may read through registry 112 and/or log file 114 to determine whether each module has been successfully installed. If state machine 106 encounters any module 110 which is associated with a failed installation, state machine 106 may retrieve the command line associated with that module and re-execute it. If the module 110 is associated with a counter value tracking the number of times installation has been attempted, as described above, state machine 106 may read the counter from the registry 112 and/or log file 114, increment the counter value by one, and write the incremented counter value to the registry 112 and/or log file 114. State machine 106 may perform the re-execution of the installation and testing of installation success in the manner described above. After re-executing the installation, determining its success, and writing to the registry 112 and/or log file 114, state machine 106 may continue to identify and re-execute previously failed installations. Upon determining that all modules 110 have been successfully installed, state machine 106 may halt.

As illustrated, application(s) 108 may be any sort of application(s) known in the art having a plurality of modules 110. Application(s) 108 may be comprised of any number of source files, object files, libraries, and executables capable of being installed on a computing system of a computing environment 102. Exemplary application(s) 108 may include platforms, core operating system (OS) applications, application suites, custom groups of applications, and hot-fixes. In one embodiment, application(s) 108 may already be installed, and state machine 106 may simply maintain the application(s) as a single image build by installing a new module 110 of the application(s) 108 or by installing an updated version of an already-installed module 110, thus maintaining application(s) 108 without requiring the recompiling of the entire application(s) 108.

As is shown, the plurality of modules 110 of application(s) 108 may be installed in a chained fashion in a manner based at least in part on installation relationships between ones of the modules, the relationships described by data structure 104. Each of the modules 110 may correspond to an installer executable invokable by a user input, such as the entry of a command line providing the path of the executable or a click on an indicator icon. Also, as described above, the plurality of modules 110 may correspond to one of a plurality of applications 108. For example, module 110 may be the only module for an application 108, may be shared between multiple applications 108, or may be one of a plurality of modules 110 of one application 108. Further, each module 110 may be associated with one or more success criteria, such as one or more of a success code returned upon execution of an installation, a registry key, and a file version. As described above, these criteria may be included in data structure 104, and upon execution of the installer associated with each module 110, a success code may be returned, or a registry key/file version may be checked for by the state machine 106, as described above. Registry keys that may be checked for may be keys associated with a successful installation of a module 110, and file versions that may be checked for may be, for example, a most recent version of a particular file of a module 110. Success codes returned subsequent to an execution may indicate either a success or a failure of the execution.

In various embodiments, the registry 112 of computing environment 102 may be a database or similar file capable of storing settings, options, and installation results for at least one of the plurality of modules 110. For example, registry 112 may be a Windows OS registry for a 32-bit, a 64-bit, or a mobile version of a Windows OS, and may store information and settings for hardware, software, users, and preferences for a computing system, including installation results for modules 110 of application(s) 108. Registry 112 may be organized into a plurality of "keys", which may in turn have a plurality of sub keys, which may in turn include further sub keys, and so on. Each key or sub key may store one of more of a string value, a binary value, a DWORD value, a multi-string value, and an expandable string value. In some embodiments, registry 112 may be dynamically created by state machine 106 to store values related to the installations of modules 110, while in other embodiments, registry 112 may simply be provided to computing environment 102 and utilized by state machine 106. As mentioned above, state machine 106 may store values indicating the success or failure of an installation of a module 110, a criticality level of that module, a number of times installation has been attempted (or an indicator of whether installation has been attempted), a file version, etc., in a key/sub key of registry 112.

In some embodiments, log file 114 may be any sort of file capable of storing at least a representation of each module 110 and an indicator of whether an installation of that module 110 was successful. In one embodiment, log file 114 may store one or more of a criticality level of the module, as described above, a number of times installation has been attempted, a registry 112 key having installation information, and a file version. Such information may be stored in any fashion known in the art within log file 114. In various embodiments, log file 114 may be created in advance, and may be written to be state machine 106, while, in other embodiments, log file 114 may be dynamically created by state machine 106 prior to performing any module 110 installations. In one embodiment, log file 114 may be stored on any computing system of computing environment 102, in any folder of a file system of the computing system. As mentioned above, state machine 106 may store values indicating the success or failure of an installation of a module 110, a number of times installation has been attempted (or an indicator of whether installation has been attempted), a criticality level of that module, etc., in log file 114.

Figure 2:
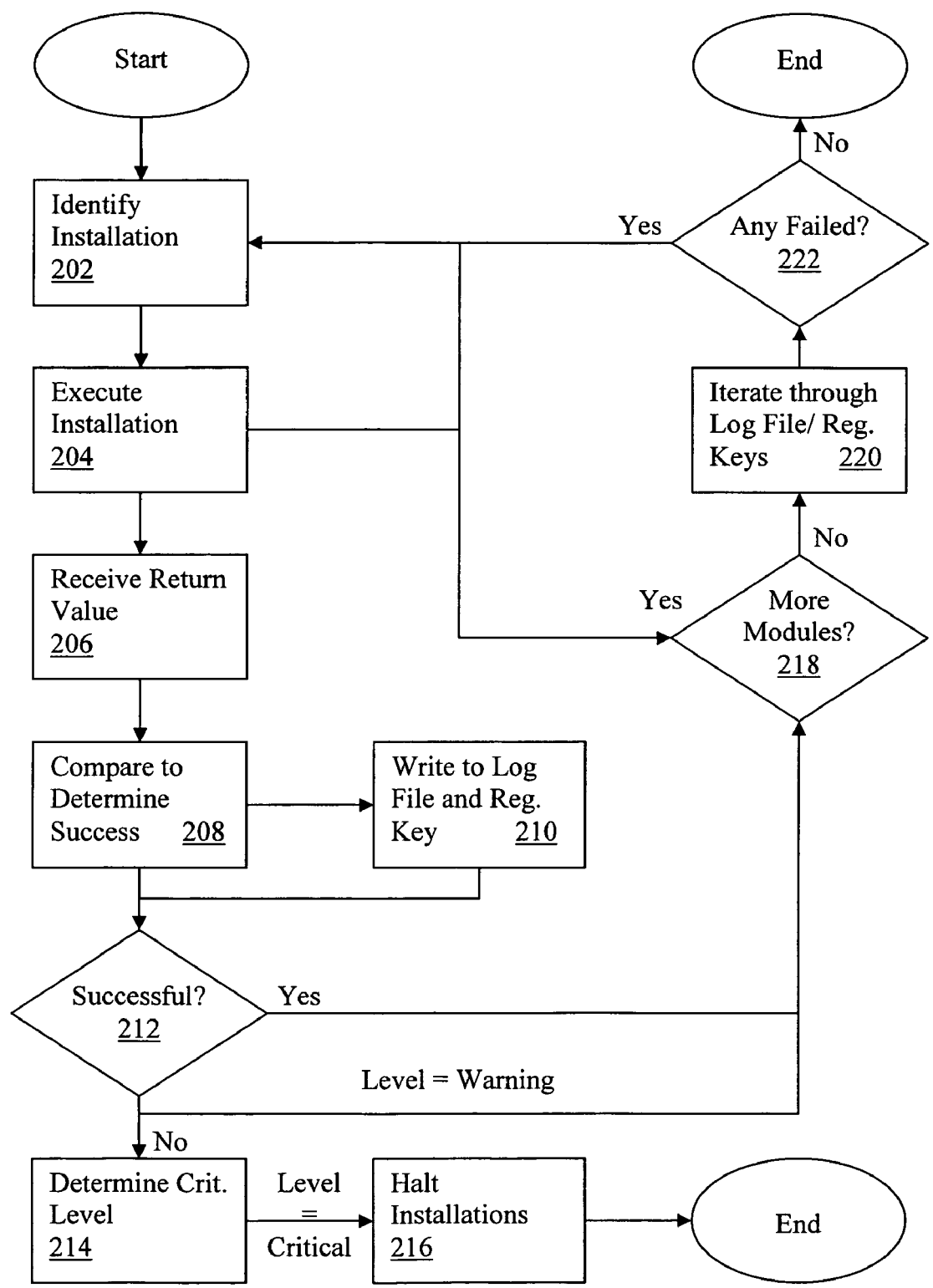
FIG. 2 illustrates a flow chart view of selected operations of the methods of various embodiments of the present invention.

FIG. 2 illustrates a flow chart view of selected operations of the methods of various embodiments of the present invention. As illustrated, in some embodiments, a state machine of a computing environment may identify a module installation of one of a plurality of modules of one or more applications, and may execute that installation, blocks 202-204. The one or more applications to be installed by the state machine may include a platform, an application suite, a custom group of applications, a single application, and/or a hot-fix, in various embodiments. As described in greater detail above, the state machine may identify the module based on installation relationships between at least some of the plurality of modules described by a data structure, block 202. The data structure, in one embodiment, may be a tree structure implemented by an XML file. The data structure may further describe parent-child installation relationships between installers of some of the modules, and may include success criteria for at least some of the module installations, such as return values expected, registry keys, and file versions. Upon identifying the appropriate module installation, the state machine may execute the module installation, block 204. In one embodiment, a module installation may be invoked to be executed through a command line.

In various embodiments, the state machine may receive a return value from each installer upon execution of each module installation, block 206. The return value may indicate success or failure of a given module installation. Upon receiving the value, the state machine may compare the return value, or another metric, to the above described success criteria to determine whether a given module installation was successful, block 208. If the success criteria include an expected return value, the state machine may compare the received return value to the expected. If on the other hand the success criteria include only a registry key or file version, the state machine may verify the file version and/or presence of the registry key. In one embodiment, once the comparison has been performed, the state machine may write the results of the comparison to a registry key or keys and/or a log file, block 210.

If, at decision block 212, the state machine has determined that a module installation was not successful, the state machine may determine the criticality level of the installation, which may also have been stored in the above-described data structure, block 214. The criticality level, in some embodiments, may be one of "warning" and "critical." If the criticality level is determined to be "critical", the state machine may halt installation of further modules of the plurality of modules, block 216.

As is shown, however, if the installation is successful, or is unsuccessful but has a criticality level of "warning", the state machine may next determined whether there are any additional modules needing to be installed, decision block 218. The state machine may make the decision by reference to a tree structure created by the state machine based on the data structure input. After each module installation, a node of the tree associated with that module may be removed from the tree. If there are additional modules remaining, the state machine may repeat the above described operations, blocks 202-218. If, on the other hand, the state machine determines that installations of each module of the plurality of modules have been executed, the state machine may iterate through the log file and/or registry keys, block 220, to determine if any of the module installations have failed. If any of the installations have failed, decision block 222, the state machine may repeat the above described operations, blocks 202-222, for the unsuccessfully installed modules.

FIG. 3 illustrates an example computer system suitable for use to practice various embodiments of the present invention. As shown, computing system 300 includes a number of processors or processor cores 302, and system memory 304. For the purpose of this application, including the claims, the terms "processor" and "processor cores" may be considered synonymous, unless the context clearly requires otherwise. Additionally, computing system 300 includes mass storage devices 306 (such as diskette, hard drive, compact disc read only memory (CDROM) and so forth), input/output devices 308 (such as keyboard, cursor control and so forth) and communication interfaces 310 (such as network interface cards, modems and so forth). The elements are coupled to each other via system bus 312, which represents one or more buses. In the case of multiple buses, they are bridged by one or more bus bridges (not shown).

Each of these elements performs its conventional functions known in the art. In particular, system memory 304 and mass storage 306 may be employed to store a working copy and a permanent copy of the programming instructions implementing the various components, such as the state machine, the data structure, and so forth, herein collectively denoted as 322. The various components may be implemented by assembler instructions supported by processor(s) 302 or high-level languages, such as C, that can be compiled into such instructions.

The permanent copy of the programming instructions may be placed into permanent storage 306 in the factory, or in the field, through, for example, a distribution medium (not shown), such as a compact disc (CD), or through communication interface 310 (from a distribution server (not shown)). That is, one or more distribution media having an implementation of the agent program may be employed to distribute the agent and program various computing devices.

The constitution of these elements 302-312 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A method comprising:
 processing, by a state machine operated by a computing device, a data structure having information associated with installation relationships of a plurality of modules of one or more applications and heterogeneous installation success criteria associated with respective ones of the plurality of modules;
 constructing, by the state machine, based on said processing, in a memory of the computing device, a tree structure having a plurality of nodes respectively corresponding to the plurality of modules, and a plurality of branches respectively corresponding to the installation relationships of the plurality of modules;
 identifying, by the state machine, one of the plurality of modules to be installed on the computing device based on installation relationships with one or more other modules of the plurality of modules indicated by the constructed tree structure;
 causing, by the state machine, installation of the one of the plurality of modules upon said identifying;
 verifying, by the state machine, whether the installation of the one of the plurality of modules is successful based on one or more heterogeneous installation success criteria associated with the one of the plurality of modules;
 removing, by the state machine, one of the plurality of nodes corresponding to the one of the plurality of modules from the tree structure upon verification of success of the installation of the one of the plurality of modules;
 determining, by the state machine, whether installation of the plurality of modules have been completed based on whether the tree structure is empty of nodes; and
 repeating, by the state machine, the identifying, causing, verifying, and the removing for another one of the plurality of modules upon a determination that there are one or more nodes remaining in the tree structure.

2. The method of claim 1, wherein the installation relationships of the plurality of modules include parent and/or child relationships among the plurality of modules, and the identifying is performed based on the one of the plurality of modules' parent and/or child installation relationship(s), if any, with other modules.

3. The method of claim 1, wherein said verifying further comprises:
 receiving, by the state machine, a return value associated with installation of the one of the plurality of modules,
 comparing, by the state machine, the return value to the one or more heterogeneous installation success criteria associated with the one of the plurality of modules as described in the data structure to determine whether the installation was successful.

4. The method of claim 3, wherein the one or more heterogeneous installation success criteria are selected from the group consisting of success codes returned upon execution of installations, registry keys, and file versions.

5. The method of claim 3, wherein the data structure further describes a criticality level indicating an importance of the one of the plurality of modules, wherein the criticality level is one of critical and warning, and the method further comprises, upon a determination that the one of the plurality of modules has a criticality level of critical and upon verification that the installation of the one of the plurality of modules was not successful, halting, by the state machine, installations of remaining ones of the plurality of modules.

6. The method of claim 3, wherein the data structure further describes a criticality level indicating an importance of the one of the plurality of modules, the criticality level being one of critical and warning, and the method further comprises, upon a determination that the one of the plurality of modules has a criticality level of warning and upon verification that the installation of one of the plurality of modules was not successful, performing, by the state machine, said repeating to cause installation of remaining ones of the plurality of modules that have yet to be installed.

7. The method of claim 3, further comprising, upon said verifying whether the first module installation was successful, writing a result of the verification to a log file and to a registry key.

8. The method of claim 3, further comprising, upon installations of the one of the plurality of modules, iterating through, by the state machine, a log file or registry keys storing results of said installing to further verify that each module has been successfully installed, and upon determining, by the state machine, that the one of the plurality of modules has not been successfully installed, repeating said installing for the one of the plurality of modules.

9. The method of claim 1, wherein at least one of the plurality of modules is a module selected from the group consisting of a platform, an application suite, core applications, custom groups, and hot-fixes.

10. An apparatus comprising:
 a processor; and
 a state machine operated by the processor and adapted to:
  process a data structure having information associated with parent and/or child installation relationships of a plurality of modules of one or more applications and heterogeneous installation success criteria associated with respective ones of the plurality of modules,
  construct, based on said process, in a memory of the computing device, a tree structure having a plurality of nodes respectively corresponding to the plurality of modules, and a plurality of branches respectively corresponding to the installation relationships of the plurality of modules,
  identify one of the plurality of modules to be installed on the apparatus based upon the parent and/or child installation relationships with one or more other modules of the plurality of modules indicated by the constructed tree structure,
  cause installation of the identified one of the plurality of modules,
  verify whether the installation of the one of the plurality of modules is successful based on one or more heterogeneous installation success criteria associated with the one of the plurality of modules,
  remove one of the plurality of nodes corresponding to the one of the plurality of modules from the tree structure upon verification of success of the installation of the one of the plurality of modules,
determine whether installation of the plurality of modules have been completed based on whether the tree structure is empty of nodes, and
repeat said identify, cause, verify and said remove for another one of the plurality of modules upon a determination that there are one or more nodes remain in the tree structure.

11. The apparatus of claim 10, wherein said verify further comprises:
receive a return value associated with said install of the one of the plurality of modules,
compare the return value to the one or more heterogeneous installation success criteria associated with the one of the plurality of modules to determine whether the installation was successful.

12. The apparatus of claim 11, wherein the one or more heterogeneous installation success criteria are selected from the group consisting of a success codes returned upon execution of an installation, registry keys, and file versions.

13. The apparatus of claim 11, wherein the data structure further includes a criticality level indicating the importance of the one of the plurality of modules, wherein the criticality level is one of critical and warning, and the state machine is further adapted to, upon a determination that the one of the plurality of modules has a criticality level of critical and upon verification that the installation of the one of the plurality of modules was not successful, halt installations of remaining ones of the plurality of modules.

14. The apparatus of claim 11, wherein the data structure further includes a criticality level indicating the importance of the one of the plurality of modules, wherein the criticality level being one of critical and warning, and the state machine is further adapted to, upon a determination that the one of the plurality of modules has a criticality level of warning and upon verification that the installation of the one of the plurality of modules was not successful, perform said repeat to cause installation of remaining ones of the plurality of modules that have yet to be installed.

15. The apparatus of claim 11, wherein the state machine is further adapted to, upon the installations of the one of the plurality of modules, iterate through a log file or registry keys configured to store results of said install to further verify that each module has been successfully installed, and upon a determination that the one of the plurality of modules has not been successfully installed, repeat said install for the one of the plurality of modules.

16. An article of manufacture comprising:
a tangible non-transitory computer readable medium; and
a plurality of programming instructions stored on the storage medium, and designed to program an apparatus to implement a state machine on the apparatus, that in response to operation of the state machine, to perform operations including:
processing a data structure having information associated with parent and/or child installation relationships of a plurality of modules of one or more applications and heterogeneous installation success criteria associated with respective ones of the plurality of modules,
constructing, based on said processing, in a memory of the computing device, a tree structure having a plurality of nodes respectively corresponding to the plurality of modules, and a plurality of branches respectively corresponding to the installation relationships of the plurality of modules,
identifying one of the plurality of modules to be installed on the apparatus based upon the installation relationships with one or more other modules of the plurality of modules indicated in the constructed tree structure,
causing installation of the identified one of the plurality of modules,
receiving a return value associated with execution of the install of the one of the plurality of modules,
comparing the return value to one or more installation heterogeneous success criteria associated with the one of the plurality of modules to determine whether the installation was successful,
upon a determination that the installation the one of the plurality of modules was successful, removing one of the plurality of nodes corresponding to the one of the plurality of modules from the tree structure,
determining whether installation of the plurality of modules have been completed based on whether the tree structure is empty of nodes, and
repeating said identifying, causing, receiving, comparing and said removing for another one of the plurality of modules upon a determination that there are one or more nodes remain in the tree structure.

17. The article of claim 16, wherein the installation relationships of the plurality of modules include parent and/or child relationships among the plurality of modules, and said identify is performed based on the one of the plurality of modules' parent and/or child installation relationship(s), if any, with other modules.

18. The article of claim 16, wherein the one or more heterogeneous installation success criteria are selected from the group consisting of a success codes returned upon execution of an installation, registry keys, and file versions.

19. The article of claim 16, wherein the data structure further includes a criticality level indicating the importance of the one of the plurality of modules, the criticality level being one of critical and warning, and the plurality of programming instructions are further designed to program an apparatus to implement a state machine to, upon a determination that the one of the plurality of modules has a criticality level of critical and upon verification that the installation of the one of the plurality of modules was not successful, halt installations of remaining ones of the plurality of modules.

20. The article of claim 16, wherein the data structure further includes a criticality level indicating the importance of the one of the plurality of modules, the criticality level being one of critical and warning, and the plurality of programming instructions are further designed to program an apparatus to implement a state machine to, upon a determination that the one of the plurality of modules has a criticality level of warning and upon verification that the installation of the one of the plurality of modules was not successful, perform said repeat to cause installation of remaining ones of the plurality of modules that have yet to be installed.

21. The article of claim 16, wherein the operations further include, upon installations of the one of the plurality of modules, iterating through a log file or registry keys configured to store results of said installations to further verify that each module has been successfully installed, and if the plurality of modules has not been successfully installed, repeat said causing of installation for the one of the plurality of modules.

* * * * *

UNITED STATES PATENT AND TRADEMARK OFFICE
CERTIFICATE OF CORRECTION

PATENT NO. : 7,987,460 B2  
APPLICATION NO. : 11/545229  
DATED : July 26, 2011  
INVENTOR(S) : Florence Lo Page 1 of 1

It is certified that error appears in the above-identified patent and that said Letters Patent is hereby corrected as shown below:

Col. 12, line 61, "and if the plurality of" should read --and if the one of the plurality of--

Col. 12, line 62, "repeat said causing" should read --repeating said causing--

Signed and Sealed this  
Eighth Day of November, 2011

David J. Kappos  
*Director of the United States Patent and Trademark Office*